United States Patent
Galceran Sole

(10) Patent No.: US 8,789,455 B2
(45) Date of Patent: Jul. 29, 2014

(54) DRIVE MECHANISM FOR AN OSCILLATING PISTON ROTOR

(76) Inventor: Josep Galceran Sole, Caldes de Montbui (ES)

(*) Notice: Subject to any disclaimer, the term of this patent is extended or adjusted under 35 U.S.C. 154(b) by 883 days.

(21) Appl. No.: 12/737,585

(22) PCT Filed: Jun. 19, 2009

(86) PCT No.: PCT/EP2009/057681
§ 371 (c)(1),
(2), (4) Date: Jul. 26, 2011

(87) PCT Pub. No.: WO2009/156351
PCT Pub. Date: Dec. 30, 2009

(65) Prior Publication Data
US 2011/0271830 A1    Nov. 10, 2011

(30) Foreign Application Priority Data
Jun. 24, 2008  (EP) ..................................... 08380184

(51) Int. Cl.
*F01C 9/00* (2006.01)
*F01B 9/00* (2006.01)
*F16H 1/32* (2006.01)

(52) U.S. Cl.
USPC ................................ 92/122; 92/136; 475/162

(58) Field of Classification Search
USPC ............... 92/123, 122, 136, 120; 475/31, 162
See application file for complete search history.

(56) References Cited

U.S. PATENT DOCUMENTS

| 1,701,534 | A * | 2/1929 | Knopp ............................ 418/36 |
| 6,349,679 | B1 * | 2/2002 | Mashimo et al. ........... 123/18 R |
| 7,475,667 | B2 * | 1/2009 | Al-Bannai ................. 123/197.1 |
| 2008/0098982 | A1 * | 5/2008 | Sakita ........................... 123/241 |

* cited by examiner

*Primary Examiner* — Edward Look
*Assistant Examiner* — Daniel Collins

(57) ABSTRACT

Drive mechanism for the conversion of oscillatory motion into rotating motion or vice versa by means of a non-circular gear train, in a system composed of arcuate pistons solidly fixed to a rotor which is able to oscillate about its axis inside a stator. The mechanism comprises a set of non-circular internal and external toothed gears coupled in a fashion similar to that of two epicyclic gearings joined by their respective planet gears, although there are not any sun gears in the present arrangement. All the gears cooperate so as to produce the sought motion conversion between the pistons and the planet carriers and the drive shaft attached thereon. Its field of application includes therefore any device that uses variable volume chambers as a means to transmit energy to, or obtain energy from, a working gas, such as compressors, pneumatic motors or internal combustion engines.

12 Claims, 9 Drawing Sheets

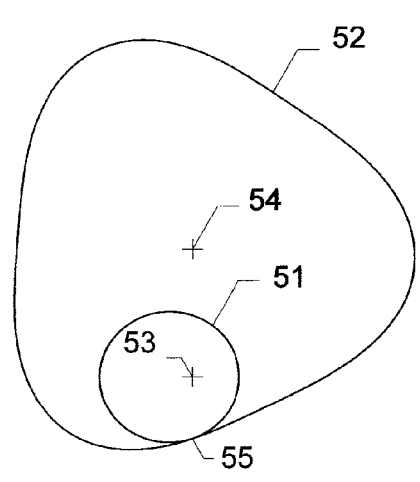 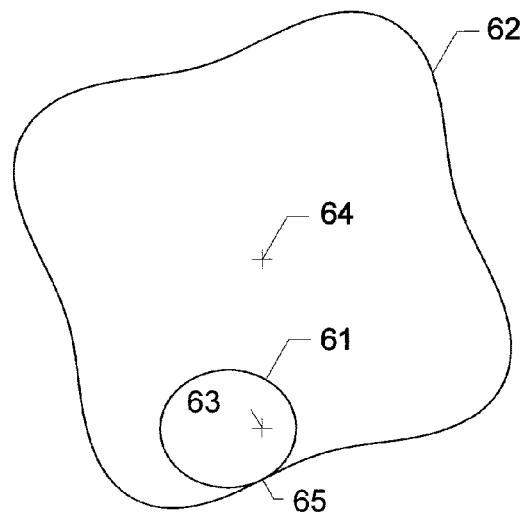
Fig. 3A    Fig. 3B
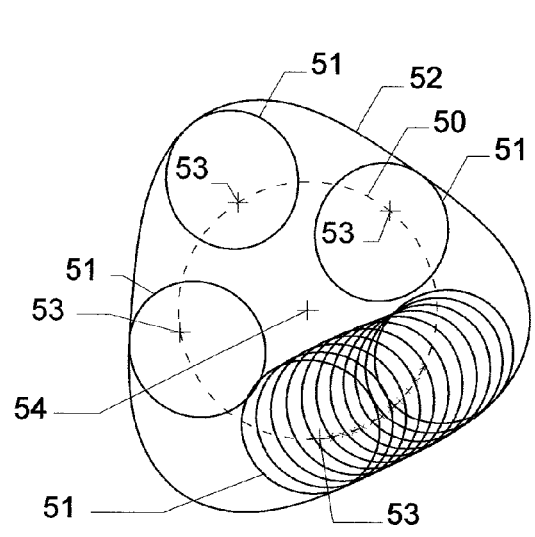 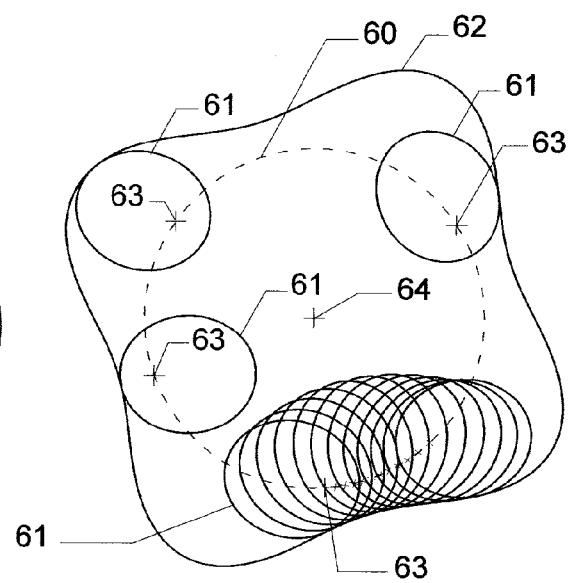
Fig. 4A    Fig. 4B

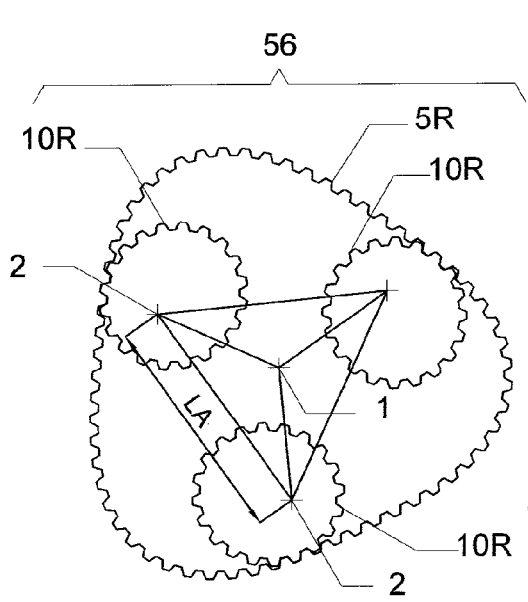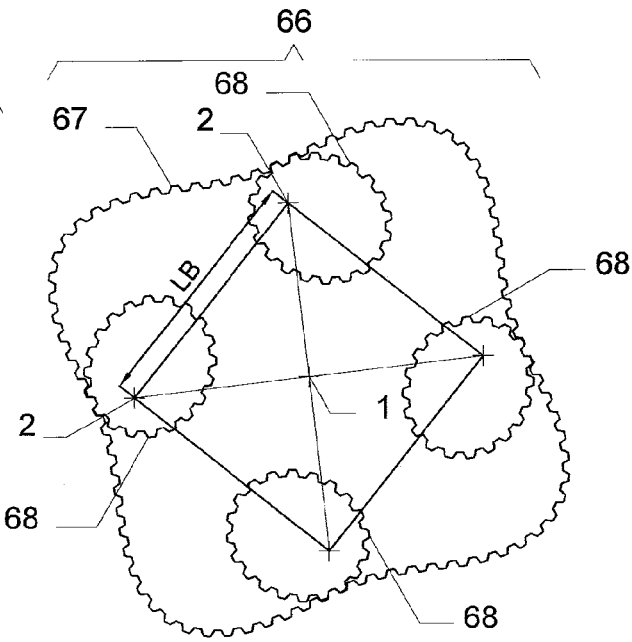
Fig. 7A  Fig. 7B
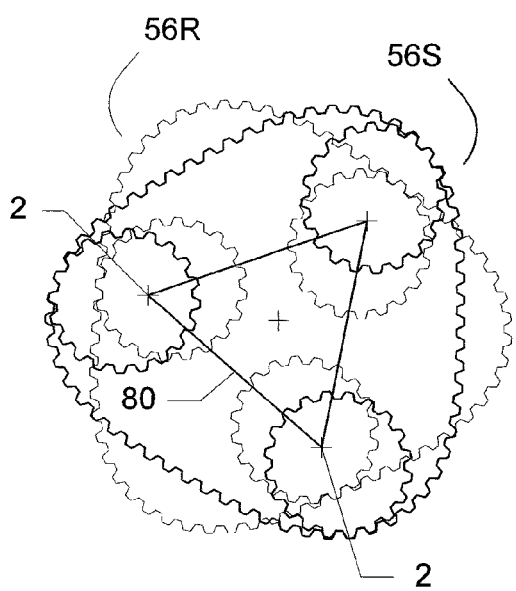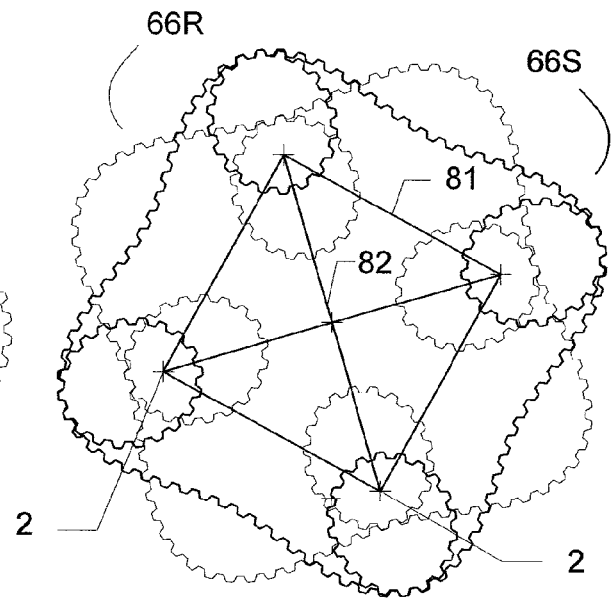
Fig. 8A  Fig. 8B

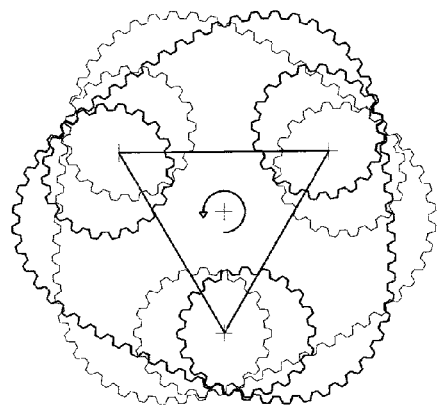 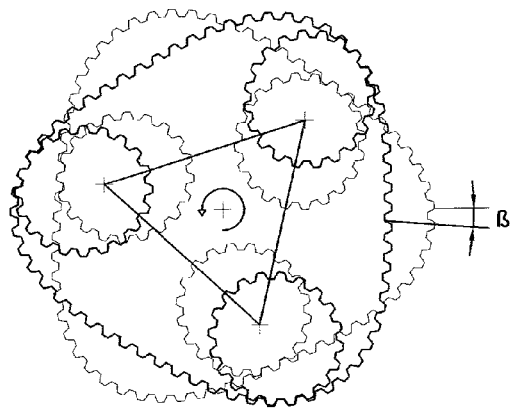
Fig. 9A  Fig. 9B
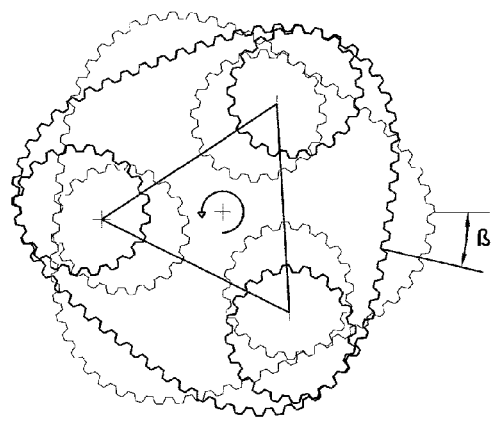 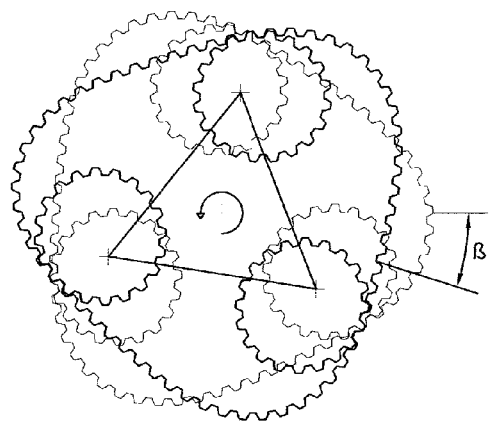
Fig. 9C  Fig. 9D
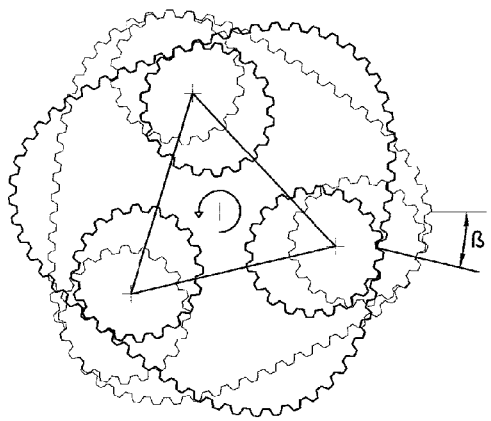 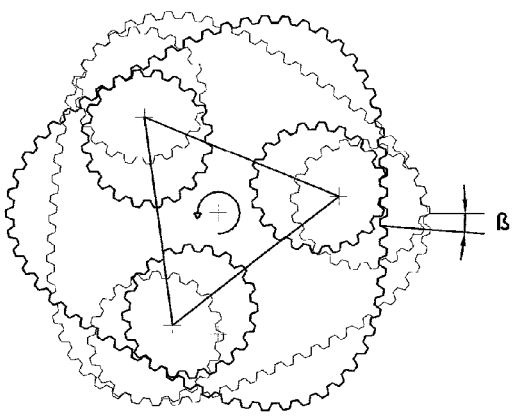
Fig. 9E  Fig. 9F

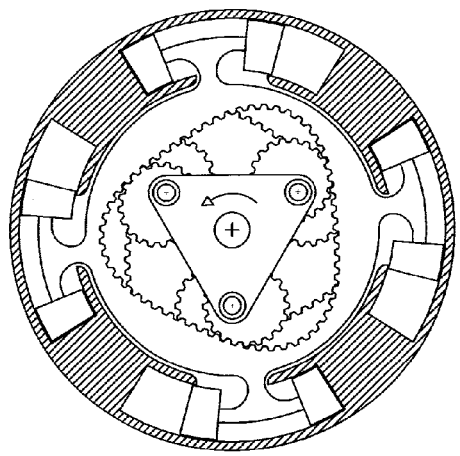
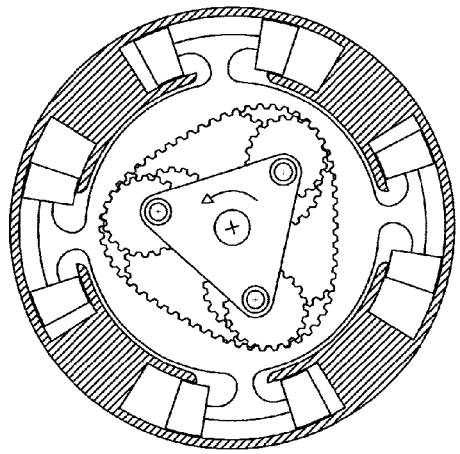
Fig. 10A  Fig. 10B
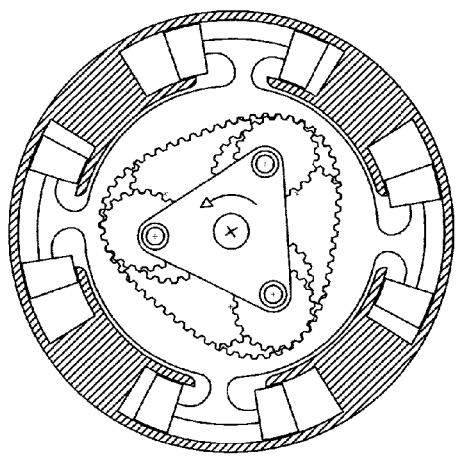
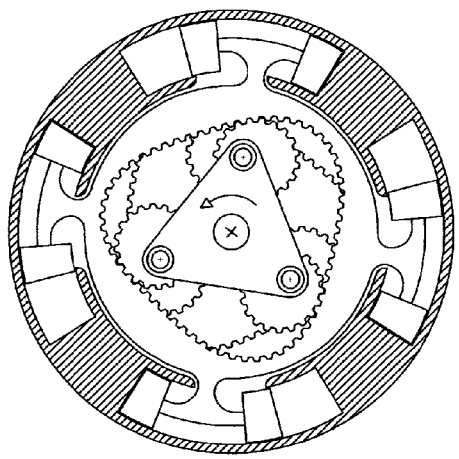
Fig. 10C  Fig. 10D
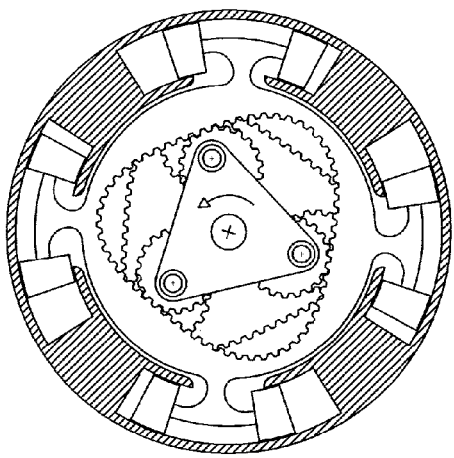
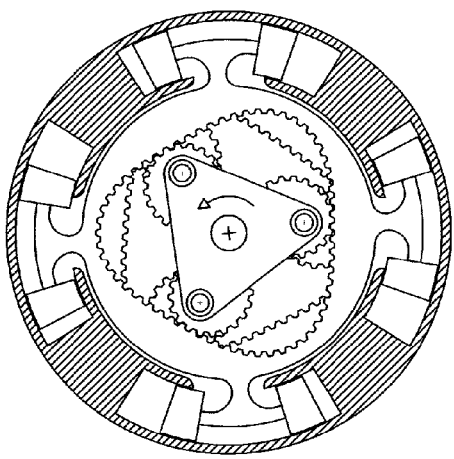
Fig. 10E  Fig. 10F

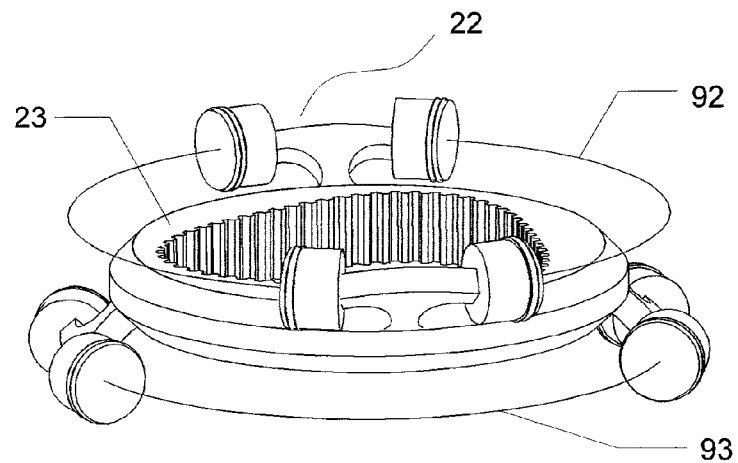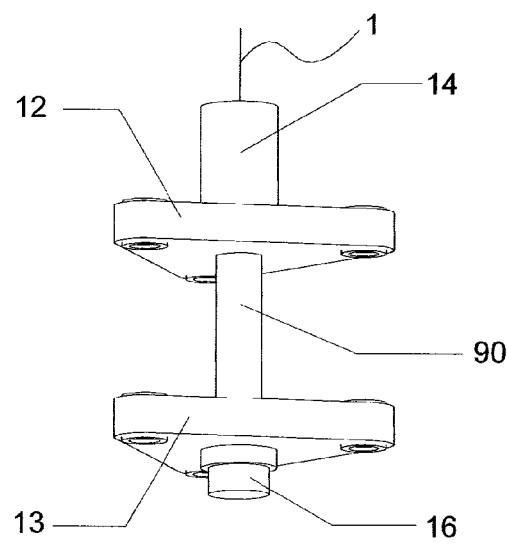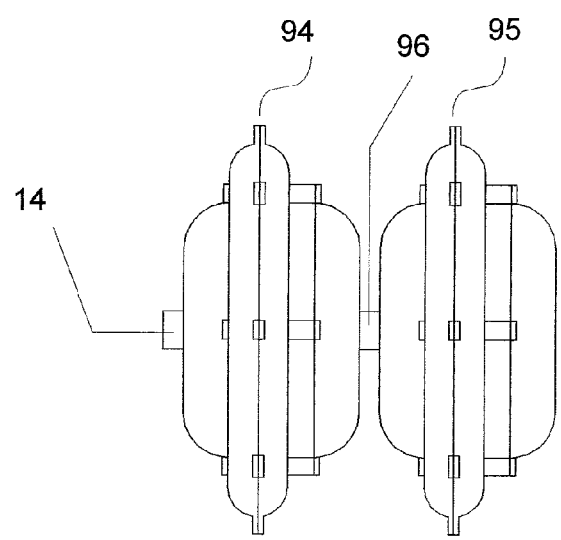
Fig. 11
Fig. 12
Fig. 13

DRIVE MECHANISM FOR AN OSCILLATING PISTON ROTOR

FIELD OF THE INVENTION

The invention relates to a drive mechanism for the conversion of oscillatory motion into rotating motion or vice versa by means of a non-circular gear train, in a system composed of pistons solidly fixed to a rotor which oscillates about its axis. Its field of application includes therefore any device that uses variable volume chambers as a means to transmit energy to, or obtain energy from, a working gas, such as compressors, pneumatic motors or internal combustion engines.

BACKGROUND OF THE INVENTION

It is well known the use of the system composed of one or more pistons and connecting rods and a crankshaft to convert the rotary motion of the crankshaft into the reciprocating motion of the pistons, which move inside cylinders forming variable volume chambers, allowing either to harness the energy of an expanding gas like in an internal combustion engine or to transmit energy to a working fluid like in an air compressor.

There are also a number of patents dealing with the subject of arranging the pistons in a circular fashion, mounted on one or two rotors, and forcing their oscillation about the axis of the system. The mechanism to produce such oscillation is generally composed of circular gears, cranks, link connections and sliding pins. U.S. Pat. No. 4,599,976 (Paul V. Meuret) for example, discloses an engine with two pistons mounted to rotate reciprocatingly about a shaft. The reciprocation of the pistons is achieved by means of a crank pin fixed to the shaft of the rotor and a connecting rod swivelably mounted to said crank pin and having a crank fixed to the rotational output shaft.

On the other hand, elliptical gears, which are a special type of non-circular gears, are used in some patents concerning a type of rotary machines which are commonly known as pursuing-piston or cat-and-mouse machines. In these machines, two rotors, each one carrying a number of pistons, fully rotate inside a housing while angularly reciprocating relative to one another. The relative angular reciprocation in this type of engines is sometimes achieved through the use of a gear train with elliptical gears. In U.S. Pat. No. 1,482,628 (Frank A. Bullington), a train composed of two circular gears and two elliptical gears are mounted on two shafts which rotate about stationary axes. In U.S. Pat. No. 3,430,573 (Eugen Groeger) the same arrangement is used except for the use of four elliptical gears or, alternatively, two elliptical gears and two circular gears mounted eccentrically. U.S. Pat. No. 3,769,946 (William A. Scherrer) describes several such gear trains to achieve the same objective. The closest prior art document may be considered U.S. Pat. No. 1,701,534 (Rudolph Knopp), which discloses another pursuing-piston type rotary engine characterized in that each of the two rotors is driven by a four-lobe non-circular ring gear and wherein these two ring gears are linked by means of a common elliptical sun gear in mesh with four planetary gears, two of them meshing in turn with one rotor and the other two with the other rotor. Thus, the main differences from the invention as claimed are: two fully rotating rotors as opposed to one oscillating rotor, the presence of a sun gear, the lack of any planet carrier and the absence of any coaxial planet gears.

SUMMARY OF THE INVENTION

The invention is set forth and characterized in the main claim, while the dependent claims describe other characteristics of the invention.

The purpose of the invention is to achieve a mechanism which produces the conversion of the rotating motion of a shaft into the reciprocating motion of a number of pistons secured to a rotor which is able to oscillate about its axis inside a housing or stator. Thus, the term "rotor" is used throughout this description with the meaning of an assembly which is able to rotate a certain angle inside a stator, and it does not imply a fully rotating part. The mechanism according to the invention comprises a set of internal and external non-circular toothed gears coupled in a similar manner to that of two epicyclic gearings, although there are no sun gears in any claimed arrangement. In a basic configuration, there is a ring gear secured to the stator, a ring gear secured to the rotor and a number of planet gear pairs composed of one planet gear meshing with the stator ring gear and another planet gear meshing with the rotor ring gear. Each pair is fixed to a common axle. All the gears cooperate so as to produce the sought motion conversion between the pistons and the planet carriers and on to the shaft attached thereon.

The device as described above is therefore able to be used in any positive displacement machine that uses variable volume chambers as a means to transmit energy to, or obtain energy from, a working gas, such as compressors, pneumatic motors or internal combustion engines.

A machine as disclosed in this invention has the following intrinsic characteristics:

Contrary to an ordinary piston-rod-crankshaft mechanism, there needn't be any contact between piston and cylinder. Thus, no force exists between them, which permits an oil-free cylinder, a feature especially important in such cases as compressors where an oil-free working gas is needed. Even in the usual case where sealing rings are used, the friction is reduced to a minimum.

All the pistons constitute a single block together with the rotor, so that there is just one oscillating component. Thus, a rotor with four double acting pistons as described in the present invention, working as a four-stroke internal combustion engine, is equivalent to a conventional four-cylinder, four-stroke reciprocating piston engine.

By changing the pitch curve of the gears, it is possible to alter the function governing the displacement of the pistons relative to the angle rotated by the drive shaft. This permits, for example, to build machines where the pistons stay longer near the dead centres compared to a sinusoidal motion. This, in turn, may allow a more efficient timing of the valves.

Working as an internal combustion engine, the energy needed for the compression stroke is directly supplied by the expanding gas without going through the drive mechanism, in contrast to conventional reciprocating multi-piston engines.

The use of internal gears enables the gear system to transmit more power compared to the equivalent external gear system.

Evenly spaced cylinders around the rotor permit an easy heat exchange.

A machine as disclosed in this invention may achieve the following functional characteristics:

All the forces acting on the pistons deriving from the working gas yield a null resultant at any given moment and they only produce a net resultant torque on the rotor. This is the case, for example, of a rotor with four double acting pistons working as a four-stroke internal combustion engine.

All the forces acting on the rotor deriving from the drive mechanism yield a null resultant at any given moment and they only produce a net resultant torque on the rotor.

All the forces acting on the stator deriving from the drive mechanism yield a null resultant at any given moment and they only produce a net resultant torque on the stator.

All the forces on the drive shaft deriving from the drive mechanism yield a null resultant at any given moment and they only produce a net resultant torque on said shaft.

The radial components of all the forces involved in the transmission of power from the pistons to the shaft are substantially reduced compared to a conventional piston-rod-crankshaft mechanism, where the forces on the crankshaft are purely axial in the dead centres and hence produce stresses and vibrations thereon.

BRIEF DESCRIPTION OF THE DRAWINGS

These and other characteristics of the invention will be clear from the following description of the preferential embodiments, given as a non-restrictive example, with reference to the attached drawings wherein:

FIG. 3A, FIG. 3B, FIG. 4A and FIG. 4B are drawings which illustrate the geometric properties of the pitch curves of the gears according to the present invention.

FIG. 7A and FIG. 7B each show the profile and geometric properties of an assembly composed of a ring gear and several planetary gears according to the present invention.

Each one of FIGS. 8A and 8B is a drawing of a drive gear train according to the present invention.

Figure 1:
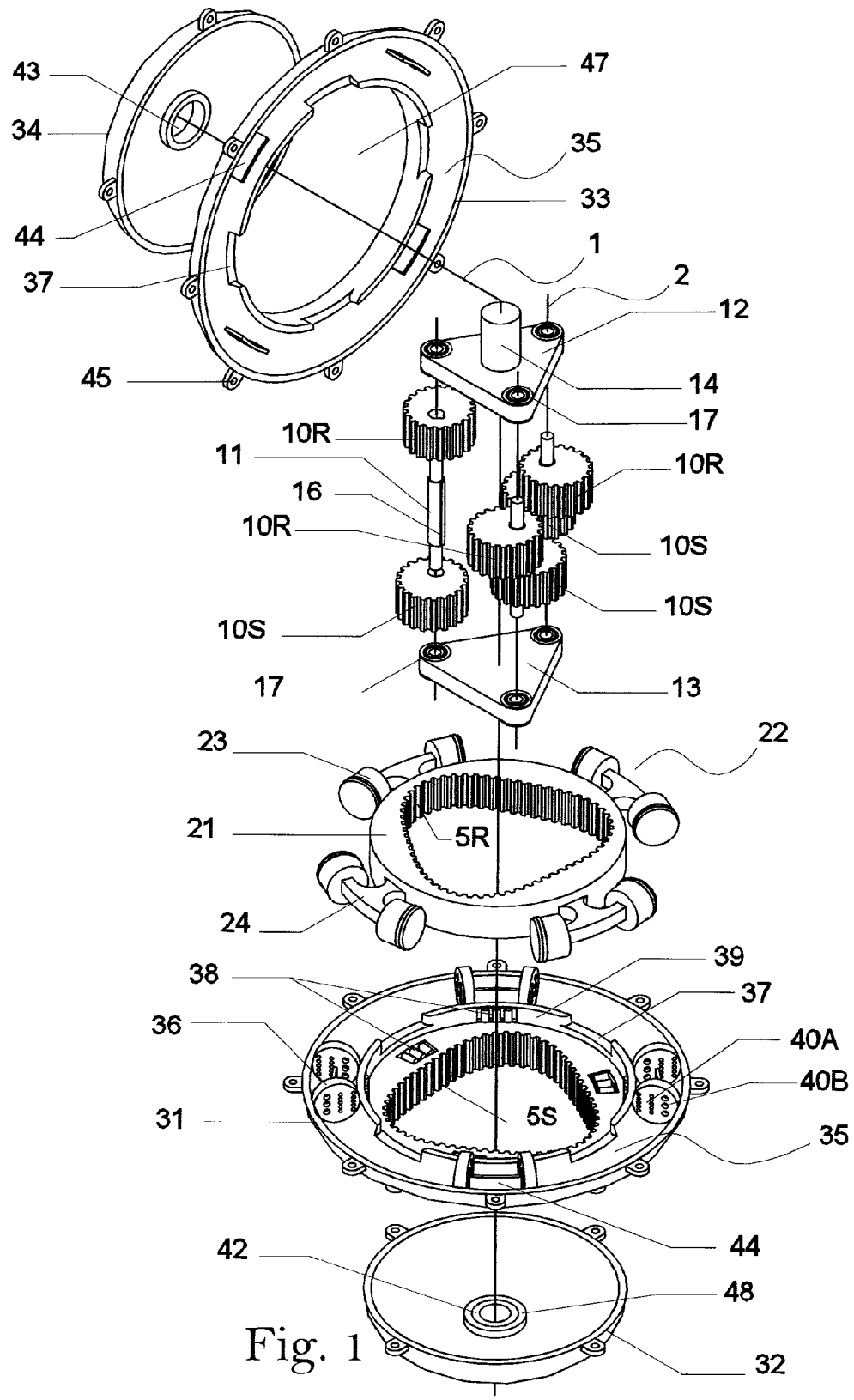
FIG. 1 shows an exploded view of a compressor in a basic configuration.

FIG. 9A through FIG. 9F are a sequence of schematic drawings showing the kinematics of the gear transmission of FIG. 1.

FIG. 10A through FIG. 10F are a sequence of schematic drawings showing the kinematics of the rotor and drive mechanism of FIG. 1.

FIG. 11 shows an alternative embodiment of the rotor characterized in that the pistons are equiangularly arranged around two circles.

FIG. 12 shows the two planet carriers of FIG. 1 with an axle interconnecting them.

FIG. 13 depicts a two-unit arrangement.

Figure 14:
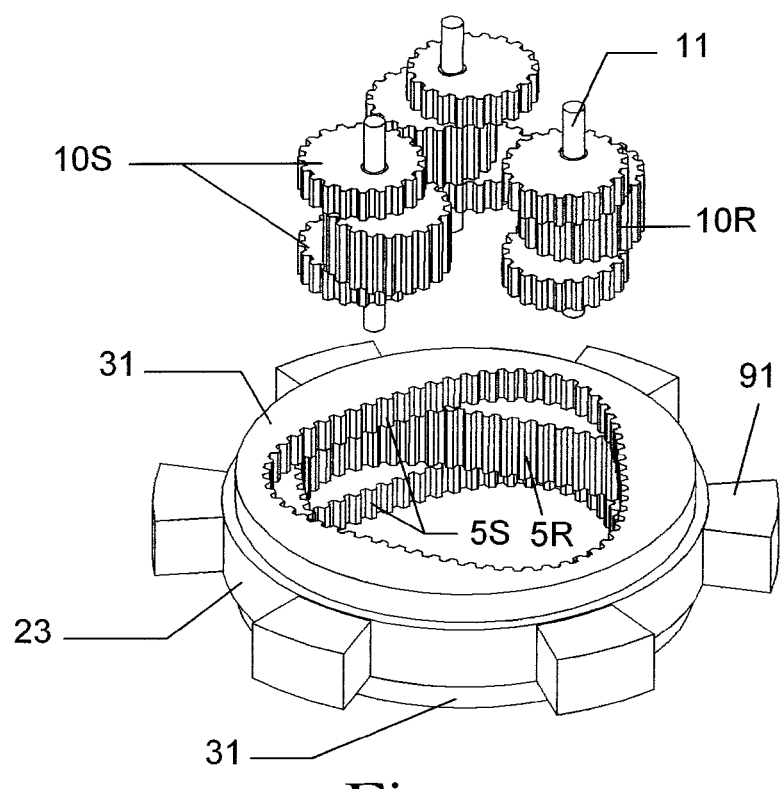

FIG. 14 shows in an exploded view another embodiment of the pistons and a drive mechanism with a redundant stator gear set.

DETAILED DESCRIPTION OF THE DRAWINGS AND DESCRIPTION OF THE PREFERRED EMBODIMENT

The following detailed description is mainly concerned with the use of the invention in a compressor. However, the invention is not restricted to this application, as it will be apparent to those skilled in the art.

Throughout this description, the following convention as regards reference signs is used: like entities with like functions have been given the same reference sign (e.g. "cylinders 35"); like entities with different functions have reference signs beginning by the same number and followed by one or more letters in upper case (e.g. "gear 5S" and "gear 5R"); a reference sign defined within the description and not found on the attached figures begins with a lower case letter (e.g. "curve c1").

Figure 2A:
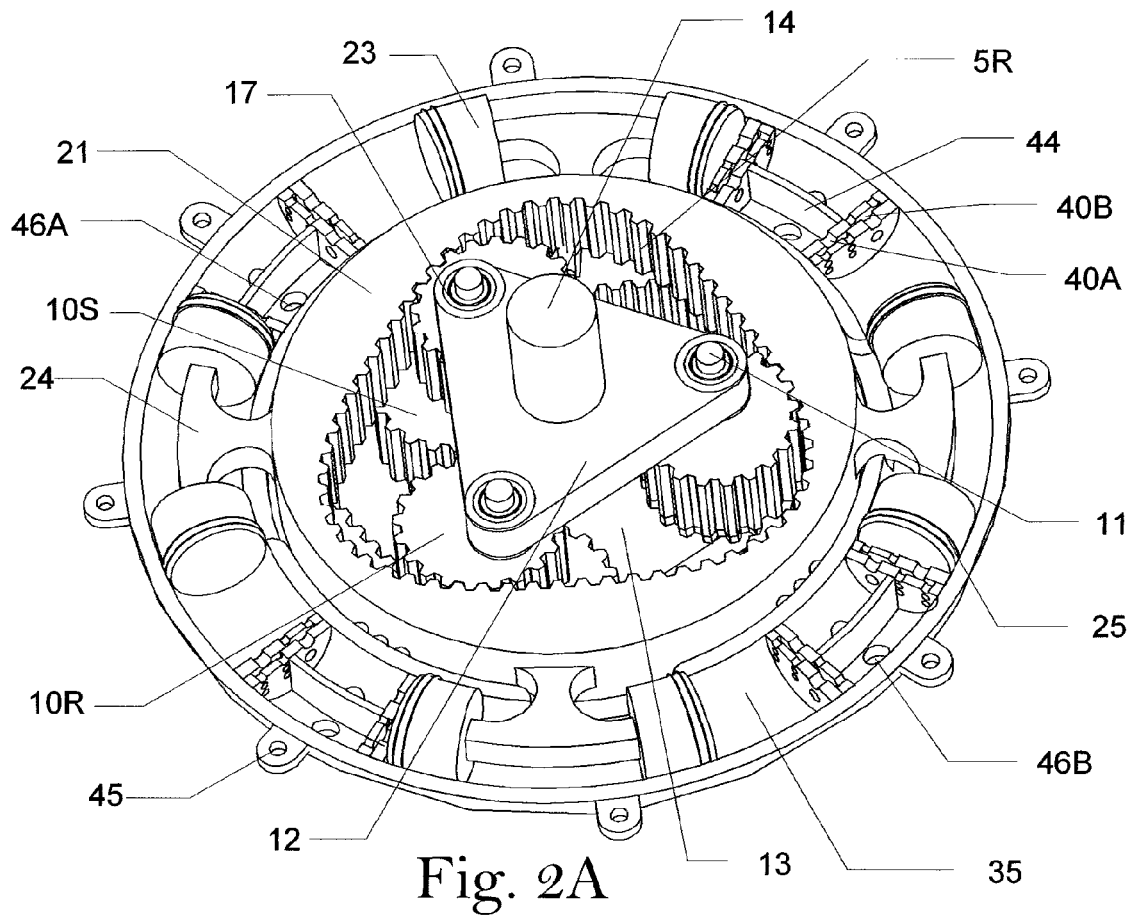
FIG. 2A shows a top perspective view of the compressor in FIG. 1 with its elements assembled, except for the top part of the stator 33 and the top cover 34. Besides, the cylinders heads 36 are shown sectioned.
Figure 2B:
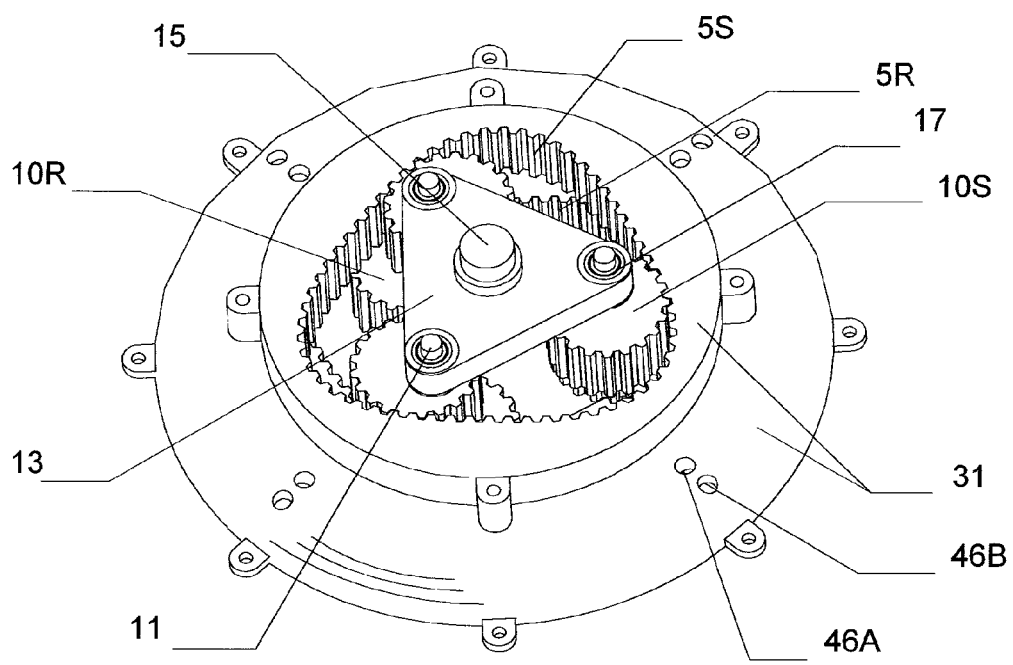
FIG. 2B shows a bottom perspective view of the compressor in FIG. 1, without the bottom cover 32.

With reference to the attached drawings FIG. 1, FIG. 2A and FIG. 2B, said compressor embodies the following major elements:

a) A rotor 21 of cylindrical shape pivotable about its axis 1, said rotor having a large hollow in its middle so as to accommodate a three-lobed internal toothed gear 5R (called rotor ring gear throughout this description) fixed thereto and centered on said axis 1.

b) Four pistons 22, each one composed of two part-toroidal heads 23. Each piston is of the double-acting type, meaning by that that a variable working chamber is created at each end thereof as it reciprocates. The two piston heads 23 are held together by means of a T-shaped connecting link 24 which also serves to solidly attach the pistons to the rotor 21, said pistons 22 being therefore able to oscillate therewith. Said four pistons are equiangularly distributed around the rotor 21, with 90° of angular separation between adjacent pistons.

c) A stator divided in two parts 31 and 33 held together by securing means like bolts (not shown) going through corresponding bores in the studs 45. Each said part has hollowed-out sections with a part-toroidal shape that form the cylinders 35 when they are put together. Each cylinder accommodates an oscillating piston with a minimum clearance in between which is swept by the sealing rings 25. Each cylinder head 36 has a pair of check valves (40A,40B). (In FIG. 2A these valves are shown sectioned). An intake valve 40A provides the inflow of gas coming through the intake port 46A to the cylinder, and a discharge valve 40B allows the outflow from the cylinder to the discharge port 46B. An arcuate wall 44 provides a partition between intake and discharge gas. The lower part of the stator 31 has a large hollow in its middle to accommodate a 3-lobed internal toothed ring gear 5S, called stator ring gear hereafter, identical to the rotor ring gear 5R and centered on axis 1 as well. Said stator part 31 also has a cylindrical recess 39 next to the ring gear 5S, with a diameter slightly larger than that of the rotor. There are rollers 38 seated on the walls of this cylindrical recess 39, so that the rotor is journalled into this recess and rests free to rotate in contact with said rollers. The upper part of the stator 33 also has a cylindrical bore 47 with the same diameter as the recess 39 to accommodate the rotor. The walls of the recess 39 and of said cylindrical bore have slots 37 to permit the passage of the connecting links 24 as well as their displacement. These slots 37 extend through an arc slightly larger than the amplitude of oscillation of the pistons without reaching the working chamber. This way, the rotor is free to rotate about axis 1 within the bounds of the cylinders.

d) A set of six identical elliptical external toothed gears (three gears 10S and three gears 10R), each one having a bore drilled on one of its foci. Said gears are called planet gears throughout this description due to their similarities with planet gears in epicyclic gear trains, although there are no sun gears in any arrangement according to the present invention. Said planet gears are grouped in pairs composed of one gear 10S and one gear 10R in such a manner that each pair has a common axle 11 passing through their bores and fixing their relative position with a key 16 at an angle of 180° between their respective maximum radii. The three planet gears 10S mesh with the stator ring gear 5S, whereas the three planet gears 10R mesh with the rotor ring gear 5R. Each axle 11 has an axis 2 parallel to axis 1 and is journalled at each end into a respective bearing 17 seated in a respective planet carrier, 12 or 13. Said axes 2 are angularly spaced 120° from one another. The axles 11 are stepped and have a larger diameter portion that carries the planet gears and abutts the bearings 17. With this disposition, each pair of gears 10S-10R is free to rotate in mesh with ring gears 5S and 5R respectively while keeping a constant angular separation with the other pairs. The top planet carrier 12 has a semi-shaft 14 solidly attached on its centre that passes through a bore 43 on the top cover 34. The bottom planet carrier 13 has a shorter semi-shaft 15 that is journalled into a bearing 42 seated in a recess 48 at the inside face of the bottom cover 32. Semi-shaft 14 serves as an input shaft, while the other semi-shaft 15 merely serves to prevent all the group from moving axially.

Additional features like cooling means or flywheels are not shown because they because they don't form part of the invention as claimed and are part of the state of the art.

The operation of the device described hereinbefore as well as other devices that may be built according to the present invention as claimed, will be better understood in the light of the following drawings.

FIG. 3A illustrates an elliptical curve 51 with point 53 in one of its foci, said curve being internally tangent at point 55 with curve 52 which in turn has point 54 as its geometric centre. As shown in FIG. 4A, curve 52 has such a shape that as curve 51 rotates instantaneously and consecutively about its tangent point 55, its focus 53 always lies on the circumference 50. The longitude of curve 52 is three times that of curve 51.

The above explanation also holds for FIG. 3B and FIG. 4B substituting curves 60, 61 and 62 and points 63, 64 and 65 for curves 50, 51 and 52 and points 53, 54 and 55 respectively, except for the longitude of curve 62 being four times that of curve 61.

Figures 6A, 6B:
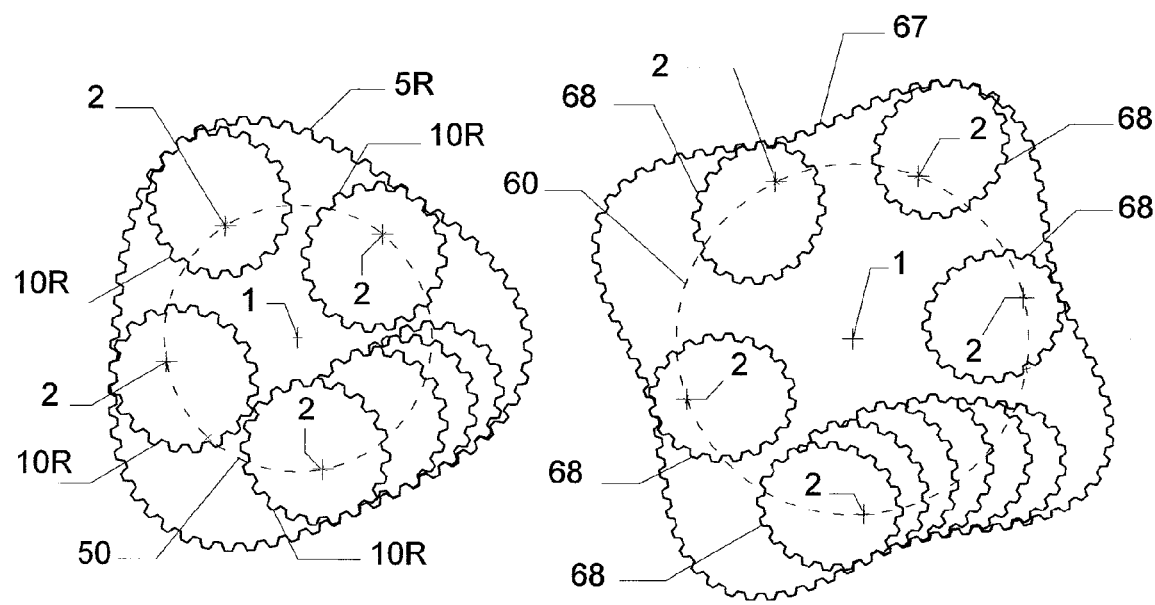
FIG. 6A and FIG. 6B show the profile of gears having the pitch curves of FIG. 3A and FIG. 3B respectively.

With reference to FIG. 6A, a pair of meshing gears 5R and 10R are depicted in different engaging positions. Gear 10R has curve 51 as its pitch curve whereas gear 5R has curve 52 as its pitch curve and three times as much teeth as gear 10R. It is also shown how gear 10R can rotate inside gear 5R in mesh therewith while keeping axis 2 passing through its focus at a constant distance from axis 1. Likewise, FIG. 6B shows a pair of meshing gears 67 and 68 with pitch curves 62 and 61 respectively, gear 67 having four times as much teeth as gear 68. Gear 68 can rotate inside gear 67 in mesh with it while keeping its axis 2 at a constant distance from axis 1.

Figures 5A, 5B:
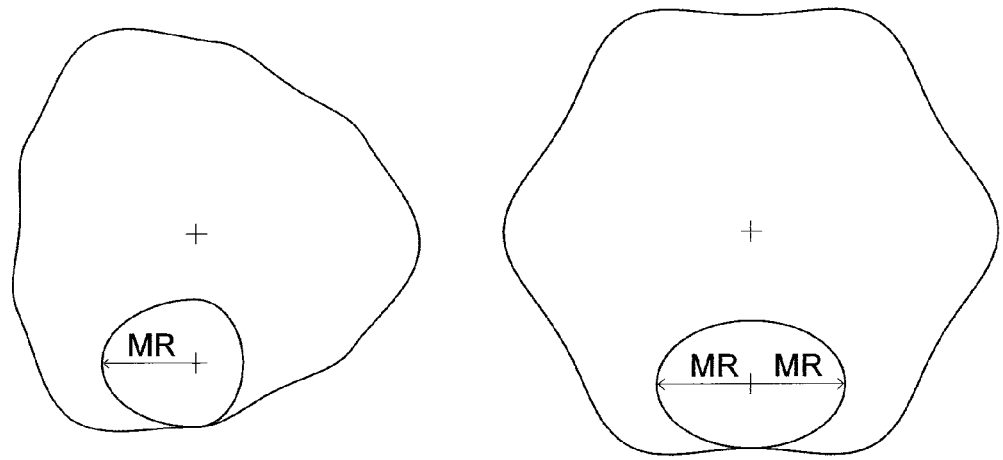
FIG. 5A and FIG. 5B are additional examples of configurations of said pitch curves.

In general, given a generic closed convex curve c1 and a point p1 in its interior, it is possible to draw another closed curve c2 internally tangent to curve c1 at one point such that when curve c1 rotates instantaneously and consecutively about its tangent point, point p1 is always at the same distance from the geometric centre p2 of the exterior curve. The longitude of curve c2 is then a multiple n of the longitude of curve c1. Such curves c1 and c2 are defined as conjugate curves. A conjugate curve c2 can be constructed for every curve c1 and for every number n. FIG. 5A and FIG. 5B are two additional examples of pairs of conjugate curves. The maximum radius MR of the pitch curve of each planet gear is also indicated. Further, given an external toothed gear (called planet gear) whose pitch curve is c1, it is possible to build an internal toothed gear (called ring gear) whose pitch curve is c2 and which is able to mesh with said planet gear. Said ring gear will have a multiple number n of teeth with respect to the planet gear. Such ring gear and planet gear are defined as conjugate gears.

FIG. 7A shows an arrangement comprising three planet gears 10R and a ring gear 5R. Because of their symmetrical disposition, as the planet gears rotate in synchronicity inside the ring gear, the distance LA between any two axis 2 is constant. The set composed of the four gears is defined as set 56. Likewise, FIG. 7B shows an arrangement comprising four planet gears 68 and a ring gear 67. As the planet gears mesh with the ring gear, the distance LB between two axis 2 is kept constant. The set composed of the five gears is defined as set 66.

In a general case, since any ring gear built according to the aforementioned principles will have rotational symmetry of order n at least with respect to the axis z passing through its centre, it is possible to couple said ring gear with n conjugate planet gears in such a way that the whole set has rotational symmetry of order n with respect to said axis z. Consequently, the planet gears are equiangularly distributed around the axis z and each one has an axis w going through it that is at a constant distance from the other planet gear axes w and also at a constant distance from axis z. The set comprised of one such ring gear and n such conjugate planet gears is defined as set s.

FIG. 8A features two sets 56R and 56S, each one identical to 56 and disposed as follows. The two sets are mounted one on top of the other, with their respective planet gears grouped in pairs having their axes 2 in common and each planet gear of said pair being solidly secured to one another and having their respective maximum radii angularly offset by 180°, that is the largest angle possible in this case. Thus each said pair is forced to rotate conjointly. The three pairs 10R-10S of planet gears are shown schematically linked to one another by means of connecting links 80 that have a fulcrum on axis 2. Said connecting links 80 effectively constitute a planet carrier that forces the three said pairs to rotate in phase. FIG. 8B illustrates the same arrangement for two sets 66R and 66S, each one identical to set 66, and with connecting links 81 and 82.

In a general case, two sets s as defined above can always be arranged in the aforementioned manner as long as the two sets have the same order n of rotational symmetry. It is to be noted that to achieve the functional characteristics mentioned in the summary, a ring gear of n-fold rotational symmetry may be coupled with a number m of planet gears which is a submultiple of n greater than one.

FIGS. 9A through 9F show the kinematics of the gearing described in FIG. 8A in the case where the ring gear 5S of set 56S is stationary (fixed to a stator) and the ring gear 5R of set 56R is idle (fixed to a rotor). As can be seen in the sequence of drawings, the latter will move with an oscillatory movement about the common axis 1 as the three pairs 10S-10R of planet gears mesh with the ring gears 5S and 5R. This is shown by the variable angle •. Said drawings show all the group at successive moments during a period of oscillation, with FIG. 9F being followed by a figure identical to FIG. 9A at the beginning of a new cycle, taking into account that the planet carrier has rotated 120°. From these figures it becomes apparent that this mechanism allows to transform an oscillatory movement into a rotating movement and vice versa, that is, it transforms the oscillatory movement of ring gear 5R into the rotating movement of the planet carrier. Since this gearing is the same as the one used in the compressor of FIG. 1, it follows that the rotation of the compressor semi-shaft 14 produces the oscillation of the pistons inside the cylinders. This is shown in detail in the sequence of figures from 10A to 10F, where each figure respectively corresponds to the same moment within a period of oscillation as in FIGS. 9A to 9F. The positions where the pistons have null angular velocity and reverse their motion are equivalent to the dead centres of the pistons actuated by a rod and crankshaft mechanism.

An analogous conversion of movement can be achieved by the gear train shown in FIG. 8B or by the similar arrangement of two sets s as described hereinbefore.

An additional embodiment of the present invention is one that has the stator gear set 56S effectively sliced in two subsets which are mounted on top and on bottom of the rotor gear set 56R, as depicted in FIG. 14. The two subsets actually duplicate the functionality of the original set, since both of them have their ring gear 5S attached to the stator and their planet gears 10S fixed to the planet gears 10R of the rotor set. The purpose of this arrangement is to cancel the transverse torque sustained by axle 11 coming from the planet gears mounted thereon. Also shown in FIG. 14 is an alternative embodiment of the present invention where the arcuate pistons 91 are attached directly to the rotor, thus dispensing with the connecting links 24. In this embodiment the cylinders are formed partially by the stator and partially by the rotor. Consequently, they must be designed with a minimum clearance between the rotor and the stator and with sealing means where necessary.

FIG. 11 shows a more general embodiment of the present invention characterized in that the centerline of the pistons (and consequently of the cylinders) are alternatively arranged around two circumferences 92 and 93 instead of just one. This disposition is particularly useful when the pistons have too large a stroke to fit them all in 360°. The equiangular separation of the pistons around the rotor is but one arrangement that may achieve the functional characteristics mentioned in the summary.

An alternative embodiment to that shown in FIG. 1 consists in mounting the planet gears freely rotatable on the axles 11 with each planet gear fastened to each other by whatever suitable means, with all axles 11 being in turn solidly fixed to the planet carriers.

With reference to FIG. 12, it is shown that it is possible to join the two planet carriers of FIG. 1 by means of a shaft 90 along axis 1. Thus the two planet carriers become a single block. Because shaft 90 passes in between the planet gears, the maximum diameter permissible for said shaft depends on the geometry of the gear assembly. This shaft, in general, may have a non-circular section. Further, from a theoretical viewpoint, it should be noted that a machine according to the present invention may operate with just one planet carrier mounted on the drive shaft.

Another embodiment of the present invention is a multi-unit arrangement as shown in FIG. 13. In this figure, two units 94 and 95 share a common semi-shaft 96 that couples their respective planet carriers. Unit 94 has a drive shaft 14 that acts as the input/output shaft for all the system. The two units are in general out of phase with regard to their oscillations, normally in opposition of phases, which smoothes the compounded power delivery in the case of engines.

All the gears pictured in the figures are of the spur gear type; however, helical gears can substitute for spur gears in all cases.

The invention claimed is:

1. Positive displacement machine for transmitting energy to, or obtaining energy from, a working gas, said machine comprising:
    at least two pistons (22) spaced around a rotor (21) and rigidly attached thereto, each piston (22) being of the double-acting type and extending along an arc of circumference centered on an axis, called axis z (1) hereafter, said rotor (21) being mounted into a stator in such a way that it is able to oscillate about said axis z (1), and an assembly forming said stator, which delimitates the cylinder walls either by itself or together with the rotor (21), each cylinder (35) having intake (40A) and discharge (40B) means;
    said machine being characterized by a drive mechanism which transforms the rotating motion of a drive shaft (14) into the oscillatory motion of the rotor (21) or vice versa, said mechanism comprising:
    a ring gear (5R) having a non-circular pitch curve with rotational symmetry of order m with respect to axis z (1), m being an integer greater than two, and being fixed to the rotor (21) and centered on axis z (1);
    a ring gear (5S) having a non-circular pitch curve with rotational symmetry of order m with respect to axis z (1) and being fixed to the stator and centered on axis z (1);
    a first set of n like planet gears which are conjugate to the ring gear (5R) fixed to the rotor, n being equal to m or a submultiple of m greater than one, with each planet gear (10R) of said first set being in mesh with said ring gear fixed to the rotor (5R) in such a way that said set has rotational symmetry of order n with respect to axis z (1);
    a second set of n like planet gears which are conjugate to the ring gear (5S) fixed to the stator, with each planet gear (10S) of said second set being in mesh with said ring gear (5S) fixed to the stator in such a way that: said second set has rotational symmetry of order n with respect to axis z (1); each planet gear (10S) of said second set has an axis w (2) in common with a planet gear (10R) of the first set; and any two coaxial planet gears (10R,10S) rotate conjointly and are angularly offset by the largest angle possible between any two maximum radii of respective said two planet gears;
    at least one planet carrier (12) whereto each pair of said coaxial planet gears (10R, 10S) is connected in such a way that said pair is rotatable about its axis w (2), which axis w (2) is in turn fixed relative to said planet carrier (12);
    a drive shaft (14) attached coaxially to said planet carrier (12) for rotation therewith.

2. Machine according to claim 1, characterized in that:
    there is an additional ring gear (5S) fixed to the stator and an additional set of n conjugate planet gears (10S) meshing therewith;
    said additional ring gear (5S) has the same pitch curve (52) as the ring gear (5S) fixed to the stator mentioned in claim 1 and is mounted symmetrically thereto with respect to a plane perpendicular to axis z (1) and on the opposite side of the rotor.
    each planet gear (10S) of the additional set of n planet gears is coaxial with a pair of planet gears of claim 1 and rotates conjointly with said pair.

3. Machine according to claim 1 or 2, further comprising two planet carriers (12,13) rigidly interconnected by an element (90) along axis z (1) passing through the free space in between the planet gears.

4. Machine according to claim 1 or 2, further comprising each group of coaxial planet gears is solidly secured onto a respective axle (11), said respective axle being in turn journalled into all planet carriers (12, 13) and rotatable about its axis w (2).

5. Machine according to claim 1 or 2, further comprising each group of coaxial planet gears is rotatably mounted on an axle (11), said axle being solidly fixed to all planet carriers (12, 13).

6. Machine according to claim 1 or 2, further comprising any combination of spur gears and helical gears is used.

7. Machine according to claim 1, characterized in that all the cylinder walls are part of the stator and each piston (22) is solidly secured to the rotor (23) by means of a connecting link (24) that passes through a slot (37) in the stator, said slot extending through an arc slightly larger than the amplitude of oscillation of the pistons (22) but not reaching the working chamber.

8. Machine according to claim 1, characterized in that:
   the pistons (91-FIG. 14) are solidly and directly secured to the rotor (23) and
   the cylinder walls are formed partially by the stator and partially by the rotor, there being a minimum clearance between stator and rotor (23).

9. Machine according to claim 1, characterized in that the centerlines of the pistons (22) are arcs of the same circumference.

10. Machine according to claim 1, characterized in that the centerlines of the pistons (22) are arcs of more than one circumference (92,93).

11. Machine according to claim 1, wherein said machine is a machine selected from a group of machines including a compressor, an internal combustion engine and a pneumatic motor.

12. Two or more machines (94, 95) according to claim 1, characterized in that all said machines are axially spaced from one another and coupled to the nearby machine by some mechanical means that join their respective planet carriers and wherein the different rotors oscillate generally out of phase with each other, there being just one drive shaft (14-FIG. 13) for the whole group of machines.

* * * * *